Figure 1:
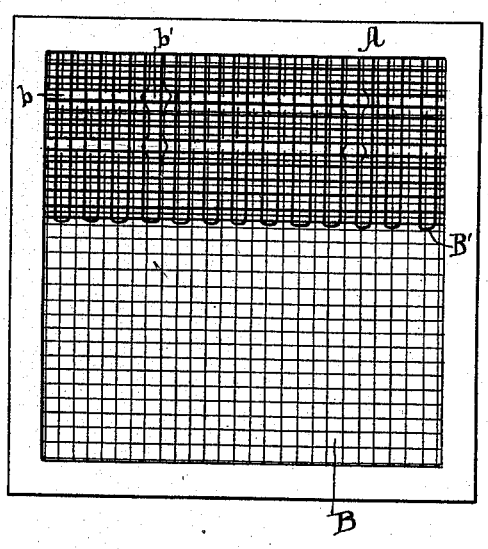

(No Model.)

C. JEMDAL.
WINDOW SCREEN.

No. 412,623. Patented Oct. 8, 1889.

Witnesses:

Inventor:
Charles Jemdal
by Lewis Abraham
Attorney.

UNITED STATES PATENT OFFICE.

CHARLES JEMDAL, OF SAVANNAH, GEORGIA.

WINDOW-SCREEN.

SPECIFICATION forming part of Letters Patent No. 412,623, dated October 8, 1889.

Application filed June 22, 1889. Serial No. 315,213. (No model.)

*To all whom it may concern:*

Be it known that I, CHARLES JEMDAL, a citizen of the United States, residing at Savannah, in the county of Chatham and State of Georgia, have invented a new and useful Improvement in Window-Screens, of which the following is a specification.

My invention relates to improvements in door and window-screens provided with one or more panels having foraminous openings which act as a barrier to the passage of insects without interfering with ventilation.

My invention relates to that class of devices of this character that will allow insects to pass outwardly from the room, but present obstacles to their entering therein, all as hereinafter fully described, illustrated in the drawings, and specifically pointed out in the claim.

Figure 2:
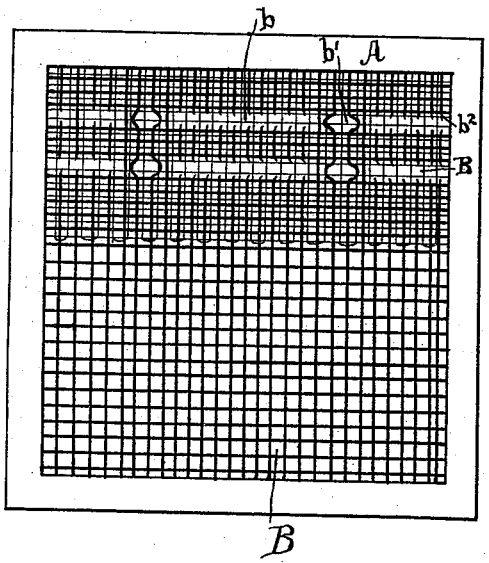
Figure 3:
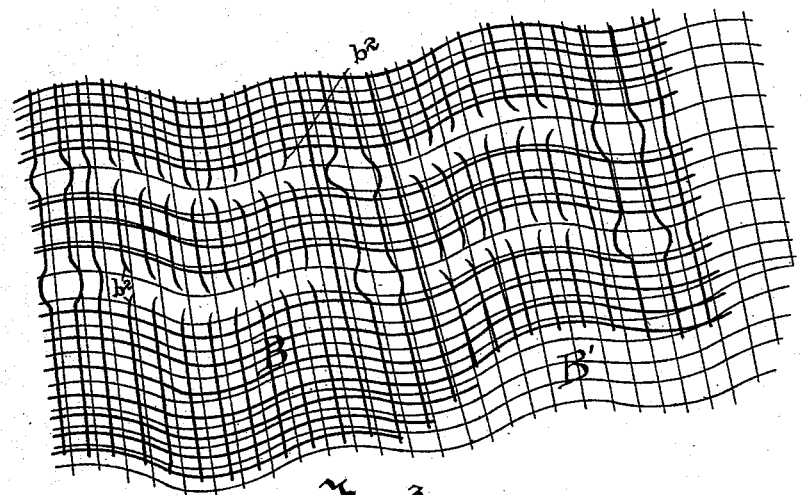

Figure 1 is a view of the inner side of a window-shade embodying my invention. Fig. 2 is a view of the reverse side thereof. Fig. 3 is an enlarged detail view of the upper portion of the main panel bent in various directions, illustrating the eduction-openings with their barbed edges.

In the drawings, A is a frame; B, the main foraminous panel, made of wire-netting; $b$, horizontal openings therein formed by dividing some of the vertical strands of the netting, leaving intervening strands intact between said openings. Two of these undivided strands are bent outwardly in opposite directions to compose orifices $b'$, one of which orifices appears intermediately of the horizontal openings $b$, the openings $b$ and orifices $b'$ alternating in a horizontal line across the screen.

There may be one or more rows of openings employed, as necessary. I show two rows in the drawings.

The ends of the vertical strands that are sundered to compose openings $b$ are turned outwardly from the plane of the panel B, to form barbs $b^2$ at various inclines to compose practically *chevaux-de-frise*. This construction is shown on an enlarged scale in Fig. 3, for the purpose of plainly illustrating its features and functions. It will be manifest that while an insect can readily pass outwardly through said openings and orifices the surrounding barbs and bent wires will present barriers to ingress. The main wire panel B covers the whole area of the frame A, and is maintained securely stretched therein by any suitable means. At the inner upper portion of the end of the frame, slightly forward of the surface of the panel B and reaching across the frame, is a short curtain B', made of wire-netting of the same character as the panel B. Insects fly naturally toward the light and instinctively crawl in an upward direction. When once alighted upon the inner surface of the panel B, they will walk upwardly and will eventually reach that portion of the panel which is under the curtain B', and in due course will creep outwardly through the openings $b$ and orifices $b'$, and will be prevented from re-entering by reason of the prongs and barbs that extend outwardly.

I do not claim, broadly, a wire-net screen having apertures in the upper portion; but What I do claim, and desire to secure by Letters Patent, is—

A window-screen consisting of a frame and a panel of wire-gauze provided with openings near its top formed by cutting the vertical strands of wire and bending them outwardly, so as to form barbs, in combination with a short interior curtain of foraminous material attached to the frame and extending downwardly from the top of the screen a little below the transverse openings, and being separated a short distance from the plane of the gauze-panel, substantially as described.

CHARLES JEMDAL.

Witnesses:
   WILLIS M. HATCH,
   EMILE NEWMAN.